United States Patent [19]

Iwata et al.

[11] 4,352,546

[45] Oct. 5, 1982

[54] CAMERA SELECTIVELY SETTABLE TO EITHER STANDARD PHOTOGRAPHIC MODE OR SUPERTELEPHOTOGRAPHIC MODE

[75] Inventors: Hiroshi Iwata, Nara; Tetsuo Yamaoka; Akitoshi Morioka, both of Osaka, all of Japan

[73] Assignee: West Electric Co., Ltd., Osaka, Japan

[21] Appl. No.: 242,576

[22] Filed: Mar. 11, 1981

[30] Foreign Application Priority Data

Mar. 14, 1980 [JP] Japan .................................. 55-32995

[51] Int. Cl.³ .......................... G03B 3/00; G03B 13/06; G03B 15/05
[52] U.S. Cl. .................................. 354/126; 354/150; 354/197
[58] Field of Search ............... 354/197, 126, 145, 149, 354/150

[56] References Cited

U.S. PATENT DOCUMENTS 3,598,031  8/1971  Harvey ................................. 354/149
4,038,673  7/1977  Schroder ........................ 354/197 X

FOREIGN PATENT DOCUMENTS 2651055  5/1978  Fed. Rep. of Germany ...... 354/197
2701581  7/1978  Fed. Rep. of Germany ...... 354/126
156053   3/1962  U.S.S.R. ............................. 354/197

Primary Examiner—John Gonzales
Attorney, Agent, or Firm—Burgess, Ryan and Wayne

[57] ABSTRACT

A camera in which a supertelephotographic lens system and a standard photographic lens system are arranged within a camera body and a standard viewfinder system and a supertelephotographic viewfinder system are so arranged that an operator can view an image of a subject through the same eyepiece window in either the standard or supertelephotographic mode. In addition, a control means is provided for controlling the use of a built-in electronic flash depending upon the selected mode and more particularly for inhibiting the use of the flash in the case of the supertelephotographic mode.

4 Claims, 8 Drawing Figures

CAMERA SELECTIVELY SETTABLE TO EITHER STANDARD PHOTOGRAPHIC MODE OR SUPERTELEPHOTOGRAPHIC MODE

BACKGROUND OF THE INVENTION

The present invention relates to a camera which can be selectively set to a standard photographic mode or a supertelephotographic mode.

In the cases of telephotography with a conventional 35-mm camera, a suitable telephoto lens must be selected and mounted on the camera body. Therefore, one must always carry a number of interchangeable telephoto and other lenses which are expensive and heavy in weight. Thus, the conventional 35-mm cameras have a poor degree of portability. In case of supertelephotography with a supertelephoto lens with a focal length of longer than 200 mm, the overall weight of the camera body and the supertelephoto lens becomes very heavy, so that one finds it very difficult to operate them or to focus a subject as he or she cannot hold the camera securely. Further, it is very troublesome to exchange the telephoto lens with a standard lens after the telephotography. Because of such poor operativity, one tends very frequently to miss "shutter" changes. In addition, the collection of various interchangeable lenses is prohibitively expensive.

There has been devised and demonstrated a compact camera of the type which uses 110-size films and which can be selectively set to a standard photographic mode or to a telephotographic mode by one operation of a selection knob or the like. However, a telephotographic lens system incorporated in such a camera as described above corresponds only to a telephoto lens of a focal length of 100 mm for 35-mm cameras. To put in another way, there has not been devised and demonstrated a compact-size camera with the telephotographic capability corresponding to that with a telephoto lens of a focal length of 200 or 500 mm.

There has been also devised and demonstrated a camera combined with a binocular. This camera is advantageous in that while one is viewing through the binoculars, one can depress a shutter button so as to obtain a photographic record. There has been already devised and demonstrated a camera combined with a binocular capable of telephotography corresponding to to the use of a telephoto lens of a focal length of 200 mm, but the camera is large in size. In addition, with this camera standard photography is impossible so that its use is limited to photography in the field.

SUMMARY OF THE INVENTION

The present invention was made to overcome the above and other drawbacks encountered in the prior art cameras and has for its object to provide a compact-size camera which can be selectively set to a standard photographic mode or a supertelephotographic mode by the so-called "one-touch" operation of a photo-mode selection knob or lever. When the camera is set to the supertelephotographic mode, one can view a remote subject on an enlarged scale. The camera is so compact in size and light in weight that it has a higher degree of transportability and a higher degree of operativity and consequently one can operate the camera very easily not only indoors but also outdoors.

According to the present invention, a standard lens system; that is, an optical system for standard photography and a supertelephotographic lens system; that is, an optical system for supertelephotography are completely separated from each other or arranged independently of each other, but one can view an image of a subject through the same eyepiece window in either the standard photographic or supertelephotographic mode. In addition, the compact-size camera in accordance with the present invention has a built-in electronic flash which can be suitably controlled depending upon the standard photographic or supertelephotographic mode and more particularly which can inhibit the use of the electronic flash in the case of the suptertelephotographic mode.

The above and other objects, effects and features of the present invention will become more apparent from the following description of a preferred embodiment thereof taken in conjunction with the accompanying drawings.

DESCRIPTION OF THE PREFERRED EMBODIMENT

Figures 1A, 1B:
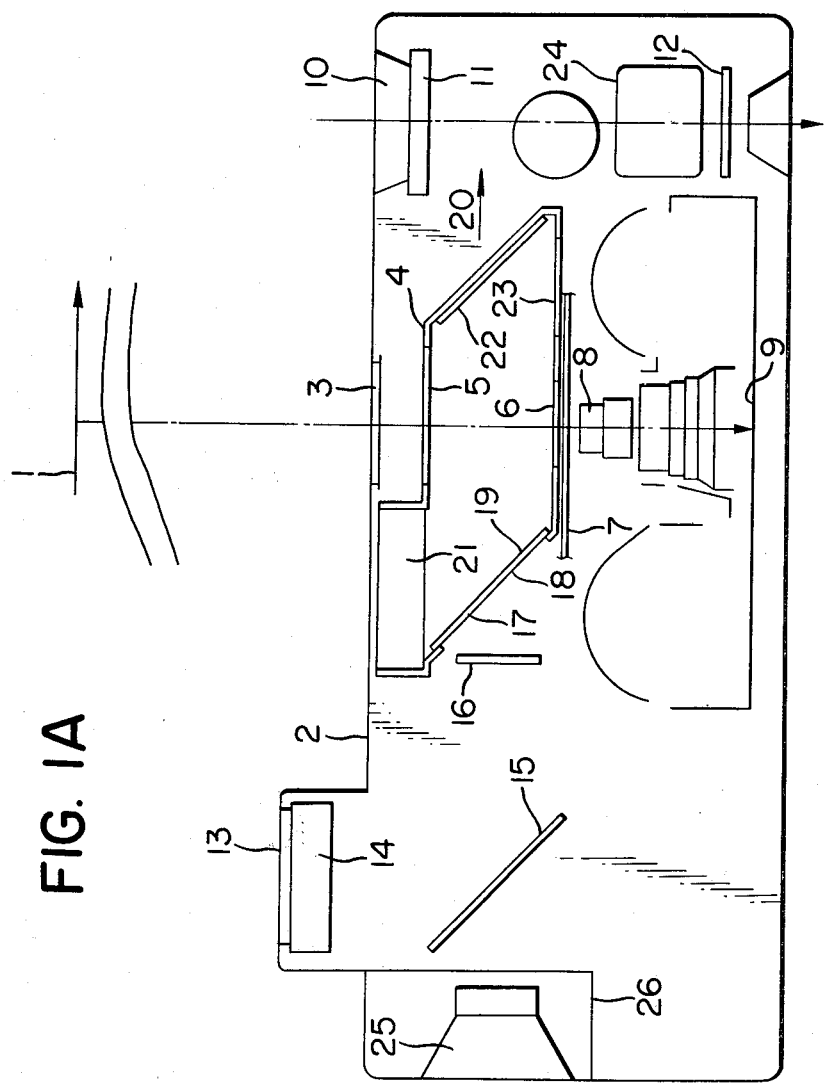
FIG. 1A shows a camera in accordance with the present invention whose top wall is removed and which is set to a standard photographic mode.
FIG. 1B is a side view thereof.

Referring to FIGS. 1A through 1D, reference numeral 1 designated an object; 2, a camera body; 3, a first light aperture formed through the front wall of the camera body 2; 4, a mirror box which is movably disposed within the camera body 2 and holds a finder lens 21 for supertelephotography, a first reflecting mirror 17 with a first reflecting surface 18 and a second reflecting surface 19 and a second reflecting mirror 22 with a single reflecting surface; 5 and 6, a first and a second light aperture formed through the walls of the mirror box 4; 7, a shutter mechanism; 8, a standard camera lens which is movable; 9, a film surface; 10, a second light aperture formed through the front panel of the camera body 2; 11, a standard finder lens; 12, a standard eyepiece; 13, a third light aperture formed through the front panel of the camera body 2; 14, a first supertelephoto camera lens; 15, a third reflecting mirror securely held within the camera body 2; 16, a second supertelephoto camera lens; 23, a third light aperture formed through the rear wall of the mirror box 4; 24, an eyepiece for supertelephotography; 25, a built-in electronic flash; and 26, a housing for the flash 25.

FIG. 1A shows the camera in the standard mode. The light rays from the subject 1 pass through the light apertures 3, 10 and 13 of the camera body into it.

The light rays from the subject 1 which has passed through the first light aperture 3 reach through the first and second light apertures 5 and 6 of the mirror box 4 and the shutter mechanism 7 to the standard camera lens 8 so as to be focused on the film surface 9. The first light aperture 3 constitutes an optical system for standard photography.

The light rays from the subject 1 which have passed through the second light aperture 10 pass through an inverted Galilean finder comprising the standard finder lens 11 and the standard eyepiece 12 and reach the eye of an operator, whereby he or she can view an erect virtual image of the subject 1. The second light aperture 10 constitutes a standard viewfinder system.

The light rays from the subject which have passed through the third light aperture 13 pass through the first supertelephoto lens 14, are redirected by the third reflecting mirror 15, pass through the second supertelephoto lens 16 and are reflected by the first reflecting surface 18 of the first reflecting mirror 17, so that the light rays disappear. To put into another way, the light rays which enter through the third light aperture 13 into the camera body 2 can reach as far as the first reflecting mirror 17 mounted on the mirror box 4, but cannot reach the eye of the operator and the film surface 9, so that they will not contribute at all to the exposure with the standard lens 8.

Figure 1C:
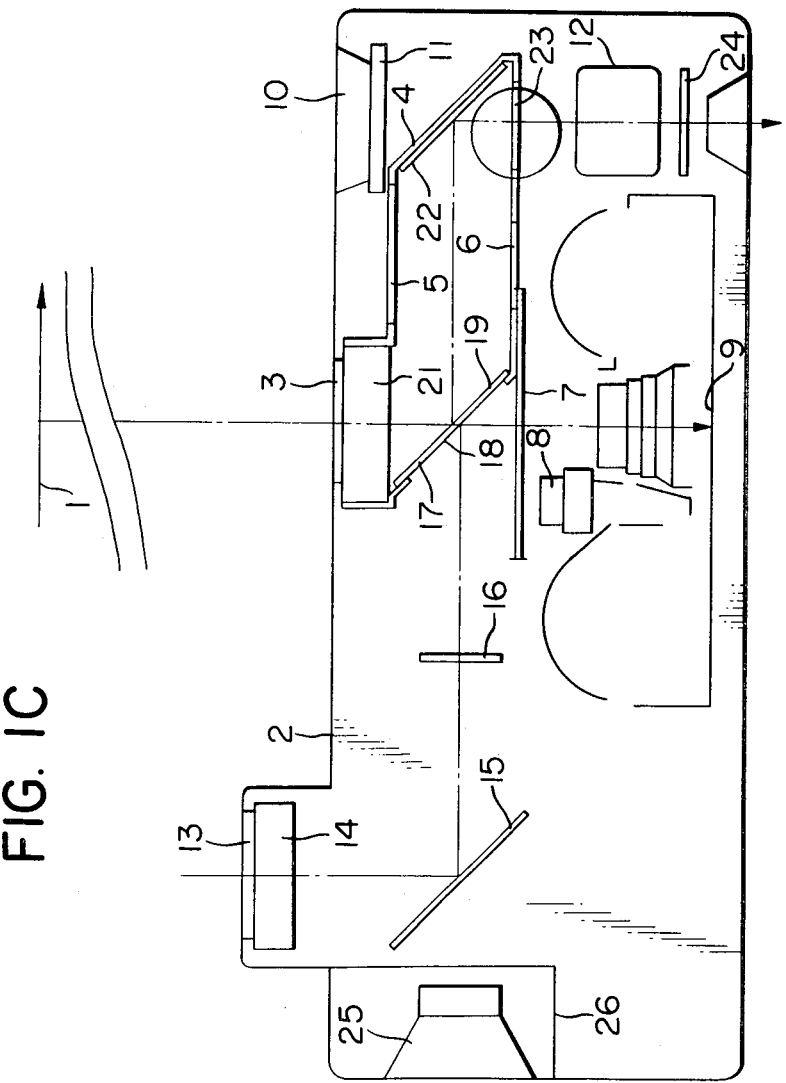
FIG. 1C is a view similar to FIG. 1A but shows the camera in a supertelephotographic mode.

FIG. 1C shows the camera in the supertelephoto mode. The mirror box 4 is shifted from the position shown in FIG. 1A to the direction indicated by an arrow 20.

As in the standard mode, the light rays from the subject 1 also enter into the camera body 2 through its three light apertures 3, 10 and 13.

Figure 1D:
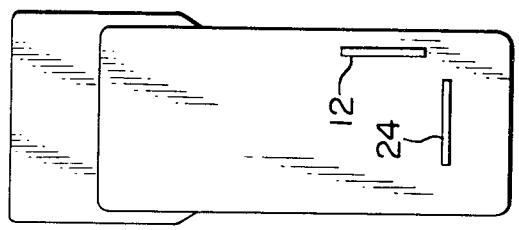
FIG. 1D is a side view thereof.

The light rays which have entered through the first light aperture 3 pass through the supertelephoto finder lens 21 into the mirror box 4, are reflected by the second reflecting surface 19 of the first reflecting mirror 17 and then by the second reflecting mirror 22 and pass through the supertelephoto eyepiece 24, reaching the eye of the operator. The supertelephoto eyepiece 24 is brought into the operative position as shown in FIG. 1D from its inoperative position as shown in FIG. 1B while the standard eyepiece 12 is brought to the inoperative position as shown in FIG. 1D from its operative position as shown in FIG. 1B by an eyepiece switching means (not shown) which is adapted to coact with the movement of the mirror box 4. The finder lens 21, the first reflecting mirror 17, the second reflecting mirror 22 and the supertelephoto eyepiece 24 constitute a supertelephoto viewfinder system.

The light rays which entered through the second light aperture 10 of the camera body 2 pass through the standard finder lens 11, but will not reach the eye of the operator because the light rays are interrupted by the inclined side wall of the mirror box 4 upon the inner surface of which is bonded the second reflecting mirror 22. In other words, the light rays which pass through the second light aperture 10 will not adversely affect a supertelephoto exposure.

The light rays which have entered through the third light aperture 13 pass through the first supertelephoto lens 14, are reflected by the third reflecting mirror 15, pass through the second supertelephoto lens 16, are reflected again by the first reflecting surface 18 of the first reflecting mirror 17, pass through the shutter mechanism 7 and are finally focused on the film surface 9. The third light aperture 13, the first supertelephoto lens 14, the third reflecting mirror 15, the second supertelephoto lens 16, the first reflecting mirror 17 and the shutter mechanism 7 constitute a supertelephoto system; that is, an optical system for supertelephogoraphy.

Figure 2:
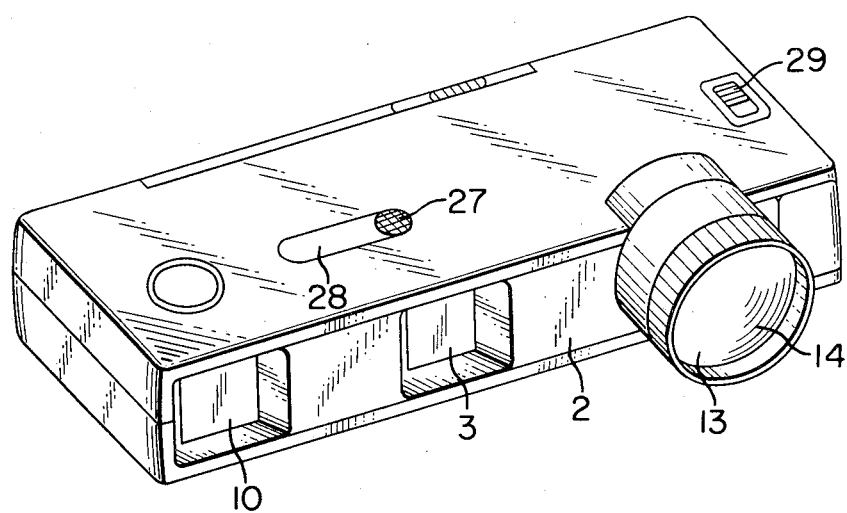
FIG. 2 is a perspective view thereof.

The camera with a supertelephoto lens system in accordance with the present invention has an outer appearance as shown in FIG. 2. Reference numeral 27 denotes a photo-mode selection knob which is slidable in an elongated slot 28 for displacing the mirror box 4; and 29, a flash selection knob.

The photo-mode selection knob 27 which is connected to the mirror box 4 controls a click spring one end of which is anchored to the mirror box 4 and the other end of which is made fast to a guide box (not shown) for guiding the mirror box 4 so that the operator can feel "clicks" when he or she slides the selection knob 27 so as to bring the mirror box 4 to the standard position as shown in FIG. 1A or the supertelephoto position as shown in FIG. 1C. Thus, the operator can confirm that the mirror box 4 has brought to the correct position. In FIG. 2, the photo-mode selection knob 27 is in the standard position corresponding to the standard mode shown in FIG. 1A. When the knob 27 is shifted to the left end of the elongated slot 28 in FIG. 2, the camera is set to the supertelephoto mode.

Figure 3A:
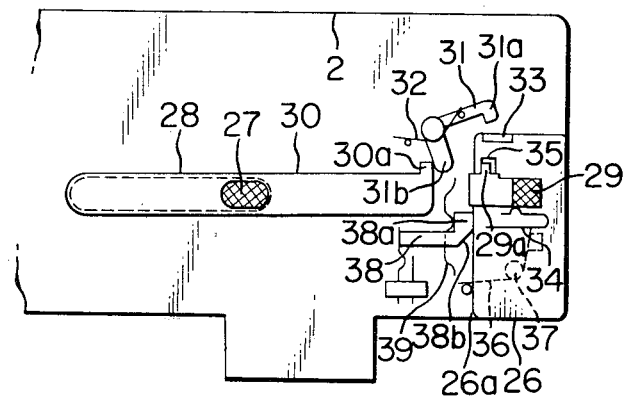
FIG. 3A shows a mechanism for controlling the mode of operation of a built-in electronic flash, the camera being set to the standard photographic mode but the electronic flash being held within the camera body.

Next, referring to FIG. 3, a mechanism which renders the built-in flash 25 inoperative in the supertelephoto mode will be described. First the mode of operation of the electronic flash 25 in the standard mode (See FIG. 1A) will be described. FIG. 3A shows the positions of the electronic flash 25 and its associated parts when the camera is set to the standard mode. (That is, the photomode selection knob 27 is at the position as shown in FIG. 2 and subsequently the mirror box 4 is in the position shown in FIG. 1A.) A projection 30a of a control lever 30 which is integral with the mode selection knob 27 is made into engagement with and pushes one end 31b of an arresting lever 31 which is normally so biased as to rotate about its pivot pin in the clockwise direction under the force of a bias spring 32, so that the arresting lever 31 is forced to rotate in the counterclockwise direction against the bias spring 32. As a result, the other end; that is, an arresting pawl 31a of the arresting lever 31 is released from a pawl-engaging recess 33 formed in the wall of the flash housing 26.

The flash selection knob 29 is normally held in the position shown in FIG. 2 under the force of a bias spring 34. When the flash selection knob 29 is shifted against the spring 34 from its normal position, an arresting projection 29a of the knob 29 is released from an engaging recess 35 formed in the wall of the flash housing 26. Then, the flash housing 26 is caused to rotate about a pivot pin 37 in the clockwise direction under the force of a spring 36, so that the flash housing 26 is partially extended out of the camera body as shown in FIG. 3B.

Referring back to FIG. 3A, one end 38a of a sliding member 38 is abutted against one wall of the flash housing 26, so that a spring 39 is deflected by the sliding member 38. Referring back to FIG. 3B, when the flash housing 26 is rotated through 90° and partially extended out of the camera body 2, the spring 39 causes the sliding member 38 to be shifted to the right, so that a tapered portion 38b of the sliding member is made into engagement with a mating tapered side edge portion 26a of the flash housing 26 as shown. As a result, an on-off switch 40 which is normally turned off as shown in FIG. 3A is turned on.

Figure 3B:
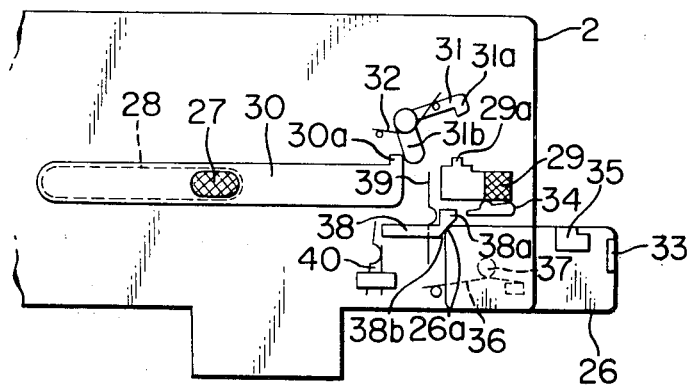
FIG. 3B is a view similar to FIG. 3A but shows the electronic flash extended out of the camera body for flash exposure in the standard photographic mode.

With the flash box 26 in the position shown in FIG. 3B, the electronic flash 25 is extended out of the camera body 2 in opposed relationship with the subject 1 (See FIG. 1) and the normally-off switch 40 is turned on, so that a DC—DC converter (not shown) is activated for flash exposure as is well known in the art.

In general, the highest guide number of the electronic flash devices incorporated into the pocket-size cameras such as the so-called 110 cameras is 15, so that obviously it is impossible to flash an object with a sufficient intensity in the case of the supertelephoto mode. In other words, supertelephotography with the aid of an electronic flash is impossible in practice.

Figure 3C:
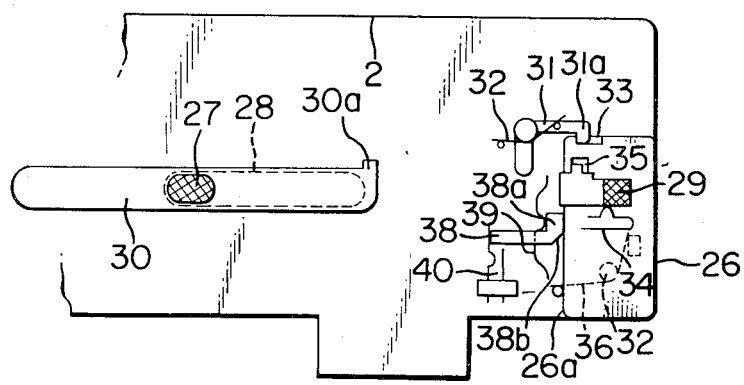
FIG. 3C shows the mechanism when the camera is set to the supertelephotographic mode, so that the electronic flash is prevented from being extended out of the camera body.

Therefore, according to the present invention a locking mechanism which renders the electronic flash 25 inoperative in the supertelephoto mode is incorporated in the camera. When the photo-mode selection knob 27 is shifted along the elongated slot 28 to the left as shown in FIG. 3C, the camera is set to the supertelephoto mode with the mirror box 4 in the position shown in FIG. 1C. As the selection knob 27 is shifted to the left, the projection 30a of the control lever 30 is moved away from the arresting lever 31, so that the latter is caused to rotate in the clockwise direction under the force of the bias spring 32 so that the arresting pawl 31a at the other end of the arresting lever 31 is made into engagement with the recess 33 of the flash housing 26.

When the flash selection knob 29 is shifted against the spring 34, the projection 29a of the knob 29 is released from the recess 35 of the flash housing 26 as described previously, but the rotation in the clockwise direction of the flash housing 26 under the force of the spring 36 is not permitted because the arresting pawl 31a at the other end of the arresting lever 31 is held in engagement with the recess 33 of the flash housing 26. Thus, the flash housing remains within the camera body 2.

In summary, according to the present invention, when the photo-mode selection knob 27 is shifted to the supertelephoto position, the flash housing 26 is automatically arrested, so that the use of the built-in electronic flash 25 can be inhibited.

As described above, according to the present invention there is provided a camera with a supertelephoto lens system which is compact in size and light in weight and simplifies the supertelephotography to such an extent heretofore unattainable with the prior art cameras.

What is claimed is:

1. A camera which can be selectively switched between a standard photographic mode and a supertelephotographic mode which comprises:
   (a) a camera body having a first light aperture formed through a wall of the camera body and through which the light rays from a subject enter into said camera body;
   (b) an optical system for standard photography for focusing the light rays which have entered through said first light aperture on a film surface through a shutter mechanism and a standard lens;
   (c) a standard viewfinder system for permitting an operator to view an image of said subject which is substantially similar to the image focused on said film surface through said optical system for standard photography, the standard viewfinder system including a second light aperture formed through said wall of said camera body, a first finder lens, a first eyepiece and an eyepiece window;
   (d) a third light aperture formed through said wall of said camera body;
   (e) an optical system for supertelephotography for focusing the light rays, which have entered said third light aperture, through said shutter mechanism on said film surface, said optical system for supertelephotography comprising at least one supertelephoto lens, a first reflecting mirror, a second reflecting mirror and said shutter mechanism arranged in the order named;
   (f) a supertelephotographic viewfinder system for permitting the operator to view an image substantially similar to that focused over said film surface through said optical system for supertelephotography which comprises said first light aperture of said camera body, a second finder lens, a third reflecting mirror, a fourth reflecting mirror, a second eyepiece and the eyepiece window; and
   (g) a control means for selecting either said optical system for standard photography or said optical system for supertelephotography so that an image of a subject is focused over said film surface through the selected optical system.

2. A camera as set forth in claim 1 wherein said second, third and fourth reflecting mirror and said second finder lens are mounted in a mirror box disposed within said camera body,
   said mirror box is connected to a photo-mode selection knob which in turn is extended out of said camera body so that an operator can operate said photo-mode selection knob so as to bring said mirror box to either a standard photographic position or a supertelephotographic position,
   said mirror box is formed with
      a first light aperture and a second light aperture through which pass the light rays which have passed through said first light aperture of said camera body, and
      a third light aperture through which pass the light rays which have passed through said first light aperture of said camera body and a fourth light aperture through which pass the light rays which have been redirected by said third and fourth reflecting mirrors, and
   when said mirror box is brought to said standard photographic position, said optical system for standard photography and said standard viewfinder system are rendered operative, but when said mirror box is brought to said supertelephotographic position, said optical system for supertelephotography and said supertelephotographic viewfinder system are rendered operative.

3. A camera as set forth in claim 2 further characterized in that:
   said camera body houses an electronic flash device which is so biased as to be extended out of said camera body into an operative position, and
   an arresting means is provided which arrests said electronic flash device within said camera body when the camera is in the supertelephotographic mode.

4. A camera as set forth in claim 3 further characterized in that:
   said arresting means comprises
   (a) a first resilient means for normally biasing a housing of said electronic flash device to be extended out of said camera body, (b) an electronic flash selection knob which is biased by a second resilient means so as to normally prevent said housing from being extended out of said camera body even when said housing is normally biased by said first resilient means and which knob is adapted to release the biasing by said first resilient means when said electronic flash selection knob is operated from the exterior of the camera body, (c) a retaining means which is normally biased under the force of a third resilient means so as to be normally engaged with an engaging recess formed in a wall of said housing, thereby preventing said housing from being extended out of said camera body under the force of said first resilient means, and (d) a control means which is operatively connected to a photo-mode selection knob for shifting a mirror box from the exterior of said camera body so that when the camera is set to the standard photographic mode, said control means releases said retaining means from said engaging recess of said housing, whereby when said flash selection knob is shifted to a flash position, said electronic flash device is extended out of said camera body to an operative position.

* * * * *